United States Patent [19]

LeSalver et al.

[11] 3,958,654

[45] May 25, 1976

[54] DEVICE FOR SUSPENDING THE BODY AND MOTOR IN AN AUTOMOBILE VEHICLE

[75] Inventors: Robert LeSalver, Chanteloup-les-Vignes; Dominique Poupard, Courbevoie, both of France

[73] Assignees: Automobiles Peugeot, Paris; Regie Nationale des Usines Renault, Boulogne-Billancourt, both of France

[22] Filed: Aug. 4, 1975

[21] Appl. No.: 601,469

[30] Foreign Application Priority Data
Aug. 7, 1974 France .............................. 74.27451

[52] U.S. Cl. .............................. 180/64 R; 280/708
[51] Int. Cl.² .................... B60K 9/00; B60G 21/00
[58] Field of Search .......................... 180/64 F, 63; 280/124 F; 248/9

[56] References Cited
UNITED STATES PATENTS

| | | | |
|---|---|---|---|
| 2,705,118 | 3/1955 | Beck | 180/64 R |
| 3,014,714 | 12/1961 | Trevaskis | 280/124 F |
| 3,088,726 | 5/1963 | Dangauthier | 280/124 F |
| 3,137,466 | 6/1964 | Rasmussen | 280/124 F |
| 3,165,161 | 1/1965 | Nallinger | 180/64 R |
| 3,395,769 | 8/1968 | Julien | 180/64 R |
| 3,547,466 | 12/1970 | Millican | 280/124 F |
| 3,778,081 | 12/1973 | Takahashi et al. | 280/124 F |
| 3,873,122 | 3/1975 | Fischer | 280/124 F |
| 3,892,424 | 7/1975 | Takahashi et al. | 280/124 F |
| 3,909,035 | 9/1975 | Aikawa | 280/124 F |

*Primary Examiner*—M. H. Wood, Jr.
*Assistant Examiner*—David M. Mitchell
*Attorney, Agent, or Firm*—Burns, Doane, Swecker & Mathis

[57] ABSTRACT

Each wheel is connected to the body through a hydraulic shock-absorber comprising two chambers of variable volume which communicate by way of a constricted passage. One of the chambers has a wall connected to the unsuspended part of the vehicle so that upward movement of the wheel tends to reduce the volume of this chamber. The motor bears on the body through at least one variable volume enclosure which is filled with an incompressible fluid and is connected by a connecting pipe to said chamber of the shock-absorber whose volume tends to be reduced when the wheel undergoes an upward relative displacement.

8 Claims, 5 Drawing Figures

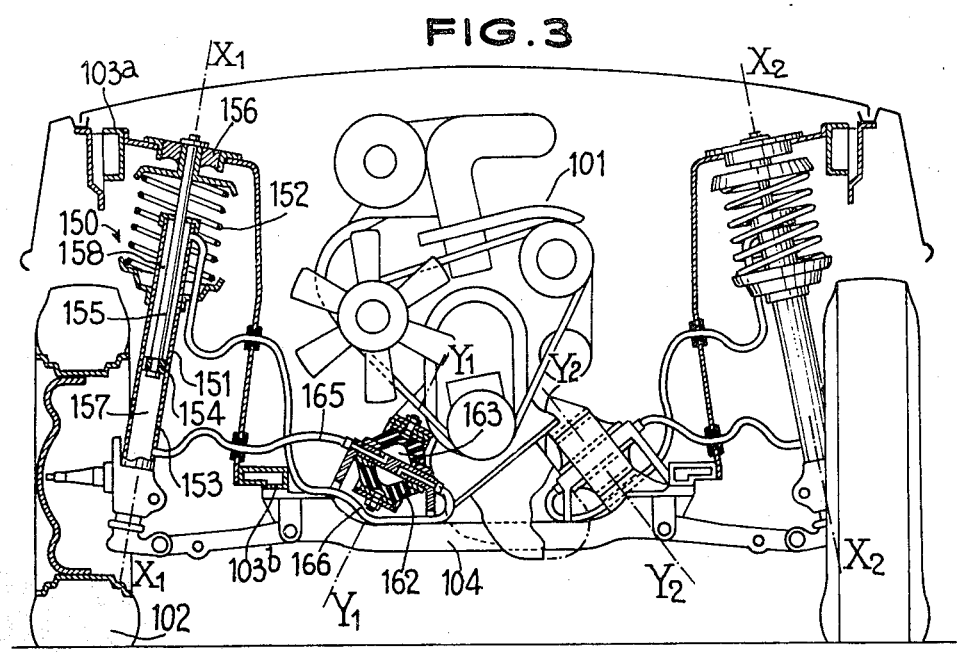
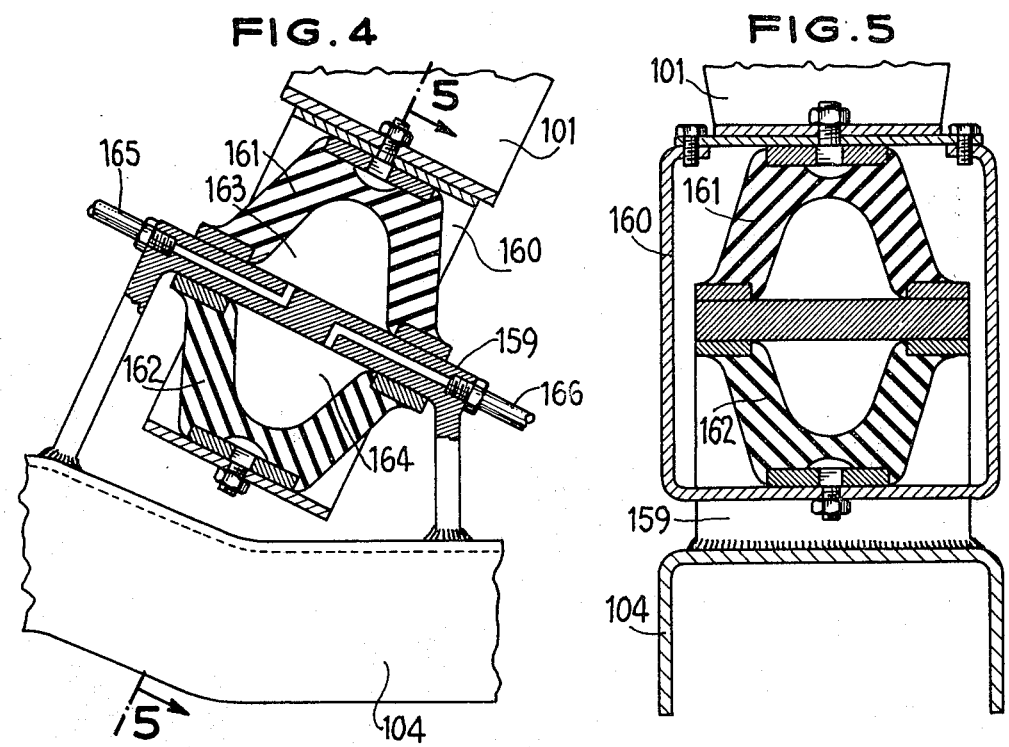

DEVICE FOR SUSPENDING THE BODY AND MOTOR IN AN AUTOMOBILE VEHICLE

The present invention relates to devices for suspending the body and motor in an automobile vehicle.

It is known that it is impossible to obtain an absolutely perfect dynamic balancing of a heat engine. This is why it is desirable to support the motor-drive unit with elastically yieldable blocks which are as soft as possible in order to transmit the minimum of vibrating forces to the body. Now, owing to irregularities of the road, the wheels of the vehicle exert forces on the body through the shock-absorbing support devices which result in relative displacements between the motor and the body which are the greater as the suspension blocks of the motor are softer. These relative displacements have a considerable adverse effect on the comfort owing to the trembling produced.

An object of the invention is to overcome this drawback with the use of flexible blocks for supporting the motor in order to achieve a good filtering of the vibrations and drumming noise due to the imperfect balancing of the motor while eliminating the vibrations due to the movements between the motor and the body under the effect of the irregularities of the road and retaining a good guiding of the wheels.

According to the invention, there is provided a suspension device for the body and motor in an automobile vehicle in which each wheel is connected to the body through a hydraulic shock-absorber comprising two chambers of variable volume which communicate by way of a constricted passage, one of said chambers comprising a wall connected to the unsuspended part of the vehcile so that a relative displacement of the wheel in the upward direction tends to reduce the volume of this chamber, the motor being elastically supported by the body, wherein the motor bears on the body through at least one variable volume enclosure which is filled with an incompressible fluid and connected by a connecting pipe to said chamber of the shock-absorber whose volume tends to be reduced when the wheel undergoes an upward reduced when the wheel undergoes an upward relative displacement with respect to the body.

Preferably, there are provided between the motor and the body two enclosures respectively connected to the chamber of the shock-absorber associated with the adjacent wheel.

According to another feature, the two enclosures associated with the motor are interconnected by a pipe in which there is placed a jet whose section is preferably adjustable.

In this way the vertical displacements of the wheels due to irregularities of the road produce, simultaneously and hydraulically, accelerations in the same direction both of the body and the motor owing to the incompressibility of the liquid. Consequently, the movements of the motor with respect to the body are considerably reduced The invention is applicable to hydro-pneumatic suspensions which have a sealed circuit or a fluid supply by means of a pump and to suspensions having telescopic cylinder and piston shock-absorbers. In the latter case, each suspension assembly between the motor and the body comprises two variable volume enclosures separated from each other and filled with incompressible fluid and each connected to a chamber of the associated shock-absorber.

Further features will be apparent from the ensuing description with reference to the accompanying drawings in which:

FIGS. 1–3 are diagrammatic front elevational views, with parts in section, of three embodiments of the suspension according to the invention;

FIG. 4 shows a detail of FIG. 3, and

FIG. 5 is a sectional view taken on line 5—5 of FIG. 4.

Figure 1:
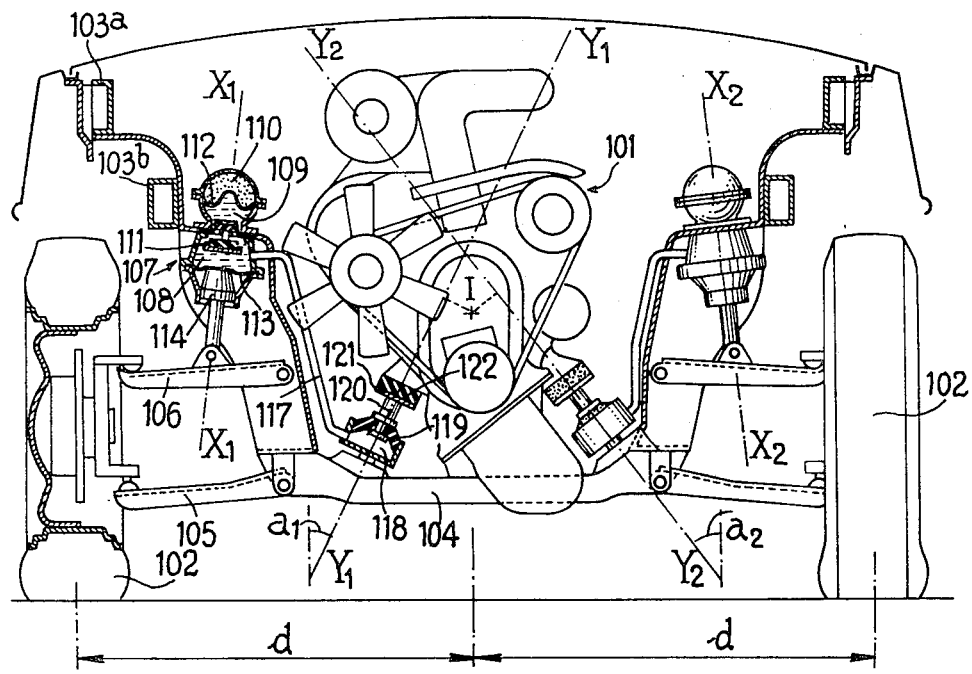

In FIG. 1 showing the front of an automobile vehicle there is seen a motor or engine 101 which is disposed longitudinally between the front set wheels 102.

The structure of the vehicle integral with the body is represented, in particular, by the longitudinal members 103a, 103b and a cradle 104. Considering one side of the set of wheels, and bearing in mind that the other side comprises similar means, the wheel 102 is connected to the body, on one hand, by lower arms 105 pivoted to the cradle 104 and, on the other, by upper arms 106 on each of which bears a shock-absorber and support element 107 having an axis $X_1$—$X_1$, the other shock-asborber of the same set of wheels having an axis $X_2$—$X_2$.

Each hydro-pneumatic shock-absorber and support element 107, of known type having a sealed circuit, defines three variable volume chambers 108, 109, 110. Tthe chambers 108, 109 are full of liquid and communicate with each other through a constriction or throttling means 111 constituting the shock-absorber proper. The chamber 110 is filled with gas performing the function of a spring,. It is separated from the chamber 109 by a flexible diaphragm 112. The chamber 108 is defined downwardly by a diaphragm 113 against which bears a piston 114 connected to the suspension arm 106.

According to the invention, the chamber 108 of the shock-absorber and support element is connected in a fluidtight manner by a conduit 117 to an enclosure or chamber 118 which is interposed between the motor and the body and integral with the cradle 104. This enclosure 118 is closed in its upper part by a diaphragm 119 of low stiffness to which is secured a rod 120 which terminates in an armature 121 connected by an elastically yieldable block 122 to the motor 101. The plane of the diaphragm 119 is perpendicular to an axis $Y_1$—$Y_1$ contained in a roughly transverse plane with respect to the vehicle and which will be more precisely defined hereinafter.

Owing to the arrangements described herein before, any impulse on the piston 114 resulting from vertical displacements of the associated wheel produced by irregularities in the road, is simultaneously transferred to the body and the motor hydraulically and directly from the chamber 108 to the enclosure 118.

Preferably, the dimensions of the enclosures 118 and the inclinations of the axes $Y_1$—$Y_1$ and $Y_2$—$Y_2$ are so chosen that the ratio between the mass impedance of the body in the region of the axle and the mass impedance of the motor in the region of the block 122 is equal to:

$$\left( \frac{l_1}{l_2} \times \frac{s}{s_1 \cos a_1} \right) - 1 \text{ or } \left( \frac{l_1}{l_2} \times \frac{s}{s_2 \cos a_2} \right) - 1$$

wherein:

$s$ is the section of a piston which, when substituted for the diaphragm 113, would produce the same variation in volume in the chamber 108 for the same travel of the piston 114;

$s_1$ or $s_2$ is the section of a piston which, when substituted for the respective diaphragm 119, would produce the same travel of the rod 120 for the same variation in volume in the enclosure 118;

$a_1$, $a_2$ are the angles made by the axes $Y_1$—$Y_1$ and $Y_2$—$Y_2$ with the vertical;

$l_1/l_2$ is the ratio between the travel of the shock-absorber and the corresponding vertical movement of the wheel.

The disclosure of our copending application, Ser. No. 558,358 filed Mar. 14, 1975, is hereby incorporated herein for its definition of mass impedance.

In satisfying this relation, the vertical accelerations produced by irregularities in the road are constantly equal for the body and the motor.

Also, preferably the respective distance between the axis $Y_1$—$Y_1$ or $Y_2$—$Y_2$ and the longitudinal axis I through the centre of gravity of the motor is given by the following expressions:

$$d_1 = d \; \frac{Im}{I_m+I_c} \times \frac{l_1}{l_2} \times \frac{s}{s_1} \quad \text{or} \quad d_2 = d \; \frac{I_m}{Im+Ic} \times \frac{l_1}{l_2} \times \frac{s}{s_2}$$

wherein:

$d$ = half the track of the set of wheels between which the motor is placed;

$Im$ = inertia of the motor about a longitudinal axis through the centre of gravity of the motor;

$Ic$ = inertia of the body about a longitudinal axis through the centre of gravity of the body.

In this way, the angular accelerations produced by irregularities in the road are equal for the motor and the body.

Figure 2:
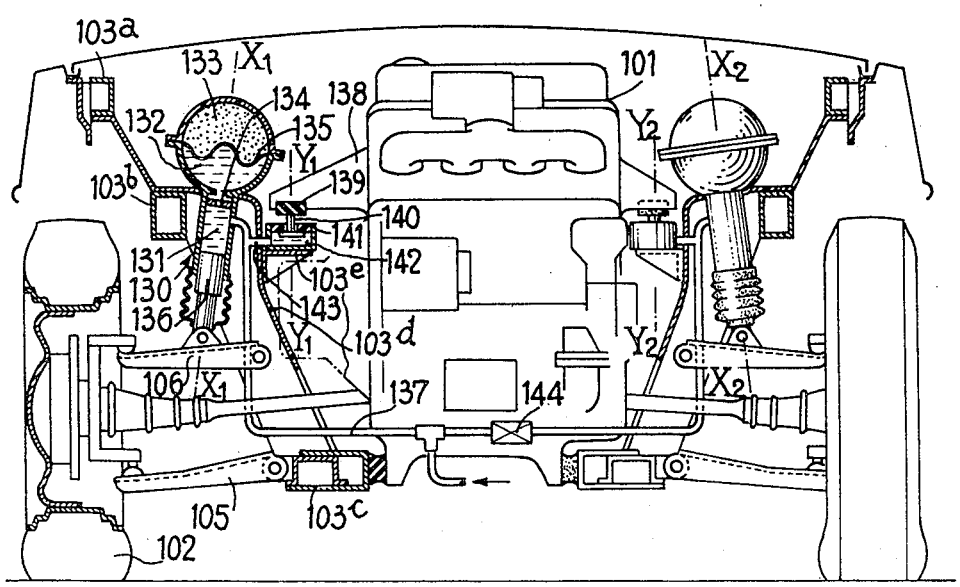

In the embodiment shown in FIG. 2, the invention is applied to a vehicle having a transverse motor-drive unit equipped with hydro-pneumatic suspension which is permanently supplied with fluid by a pump, the other component parts of the suspension being practically identical to those shown in FIG. 1.

Each wheel is associated with a shock-absorber and support element 130 of known type defining three chambers 131, 132, 133. The chambers 131 and 132 are full of liquid and communicate by way of throttling or constriction means 134 constituting the shock-absorber proper. The chamber 133 is full of gas performing the function of a spring. It is separated from the chamber 132 by a flexible diaphragm 135. The chamber 131 is closed at the lower end by a piston 136 connected to the suspension arm 106. The chambers 131 of the two shock-absorber and support elements of the same set of wheels are permanently supplied with liquid under pressure by a pump (not shown) to which they are connected by a pipe 137.

The structural elements integral with the body comprise, moreover, upper longitudinal members 103a, 103b, lower longitudinal members 103c, the winglining 103d, and a bracket 103e attached to the winglining. The motor unit 101 bears on the bracket 103d through arms 138, elastically yieldable blocks 139 and rods 140 integral with diaphragms 141 associated with enclosures or chambers 142. Each enclosure 142 is connected by a pipe 143 to the chamber 131 of the associated shock-absorber.

A jet 144, whose section is preferably adjustable, is placed in the pipe 137 interconnecting the two chambers 141 and therefore the two enclosures 142. This adjustable jet has for function to produce a pressure difference between the two enclosures 142 when a flow occurs in the pipe 137. In the case of a dissymmetrical operation and therefore different movements of the two wheels, the adjustment of the jet 144 permits the transmission of the unequal forces on each side of the motor so that the rotation of the motor about a longitudinal axis is equal to the rotation of the body.

With respect to the first embodiment, the advantages of which it retains, this arrangement permits leaving the orientation of the axes $Y_1$—$Y_1$ and $Y_2$—$Y_2$ free which facilitates the positioning and mounting.

FIGS. 3, 4 and 5 show the application to a vehicle equipped with telescopic cylinder and piston hydraulic shock-absorbers. The arrangement of the motor or engine unit is roughly that described with respect to FIG. 1.

Each wheel is associated with a shock-absorber and support element 150 comprising a hydraulic shock-absorber 151 and a coil spring 152. The shock-absorber is constituted by a cylinder 153 connected to the wheel and a piston 154 whose rod 155 is fixed to the body through an elastically yieldable block 156. The piston 154 defines in the cylinder 153 a lower chamber 157 and an upper chamber 158 which communicate with each other by way of constricted passages formed in the piston 154.

The motor 101 of the vehicle is connected to the body by means which are shown to a larger scale in FIGS. 4 and 5. These means comprise: a support 159, in the form of a yoke, integral with the cradle 104; a frame 160 fixed to the motor and surrounding the yoke 159; and elastically yieldable blocks 161, 162 in the form of a bell.

The block 161 disposed between the upper side of the frame 160 and the upper face of the yoke 159 forms with the latter a fluidtight chamber 163. The block 62 disposed between the lower side of the frame 160 and the lower face of the yoke 159 forms with the latter a fluidtight chamber 164.

The chamber 162 communicates by way of a pipe 165 with the lower chamber 167 of the shock-absorber and the chamber 164 communicated by way of a pipe 166 with the upper chamber 168 of the same shock-absorber.

The advantages of this arrangement are/the same as those of the preceding embodiment:

Any impulsion of the wheel in the upward direction tends to reduce the volume of the chamber 157 of the shock-absorber which produces therein an increase in the pressure which has a repercussion in the upper chamber 163 of the connecting means between the motor and the body. The motor and the body then undergo acceleration in the same direction, which considerably reduces the relative movements of the motor with respect to the body.

When the impulsion of the wheel is in the downward direction, it is the chamber 158 of the shock-absorber which undergoes an increase in pressure which has a repercussion in the lower chamber 164 of the connecting means between the motor and the body.

It will be noted that the presence of the chamber 164, although not absolutely essential, is highly desirable in order to avoid phenomena of cavitation in the chamber 162 when the impulsion of the wheel is in the downward direction. Indeed, in this case, the chamber 157 of the shock-absorber is put under suction as opposed to what happens in the first two applications.

The foregoing shows that the invention, in its various aspects and in particular in the embodiments shown in FIGS. 1 and 2, permits solving in a very effective manner the problem posed, while employing means already existing in the suspension of the vehicle, namely the hydraulic shock-absorber and support assemblies. The modifications to be made are relatively easy and cheap to carry out bearing in mind the important advantages resulting therefrom. Moreover, the direct connection between a chamber of the shock-absorber and the enclosure supporting the motor permits a direct and delay-free control.

Having now described our invention what We claim as new and desire to secure by Letters Patent is:

1. A suspension device for the body and the motor of an automobile vehicle having at least one set of wheels, comprising two hydraulic shock-absorbers each of which shock-absorber connects a wheel of the set of wheels to the body, each shock-absorber comprising two variable volume chambers, means defining a constricted passage interconnecting the two chambers, one of the chambers having a wall connected to an unsuspended part of the vehicle so that relative displacement of the associated wheel in the upward direction tends to reduce the volume of said one chamber, means for elastically supporting the motor on the body and comprising at least one variable volume enclosure which is filled with an incompressible fluid and a connecting pipe connecting the enclosure to said one chamber.

2. A suspension device as claimed in claim 1, comprising between the motor and the body two enclosures respectively connected to the chamber of the shock-absorber associated with the adjacent wheel.

3. A suspension device as claimed in claim 2, wherein a pipe having a jet inserted therein interconnects the two enclosures associated with the motor.

4. A suspension device as claimed in claim 3, wherein the jet has a variable section.

5. A suspension device as claimed in claim 1, wherein each shock-absorber is a hydro-pneumatic sealed-circuit shock-absorber.

6. A suspension device as claimed in claim 1, wherein the suspension of the body with respect to the considered set of wheels is achieved by hydro-pneumatic shock-absorber assemblies, a pipe connecting a pump to the assemblies so that the assemblies are permanently supplied with fluid by the pump.

7. A suspension device as claimed in claim 6, wherein each enclosure supporting the motor is connected by a pipe to the said supplying pump fluid to the associated shock-absorber assembly.

8. A suspension device as claimed in claim 1, wherein each shock-absorber is of the telescopic cylinder and piston type and said elastic supporting means suspending the motor on the body comprises two variable volume enclosures which are separated from each other and filled with an incompressible fluid, each enclosure being connected to a respective chamber of one of said shock-absorbers.

* * * * *